April 10, 1962 P. RENAUT 3,029,356
ELECTRICAL DAMPING DEVICE FOR ELECTRO-MECHANICAL TRANSDUCERS
Filed Oct. 30, 1956
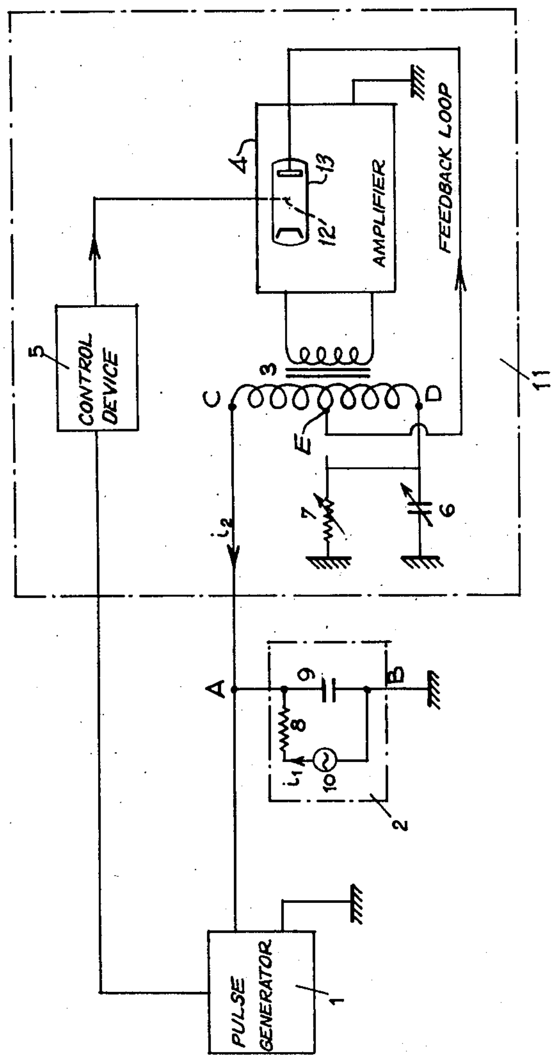
INVENTOR:
Paul Renaut 3,029,356

ELECTRICAL DAMPING DEVICE FOR ELECTRO-MECHANICAL TRANSDUCERS

Paul Renaut, Saint-Maur, France, assignor to Societe Realisations Ultrasoniques, a corporation of France Filed Oct. 30, 1956, Ser. No. 619,256
Claims priority, application France Oct. 31, 1955
7 Claims. (Cl. 310—8.1)

This invention relates to electrical damping devices for electro-mechanical transducers. In many applications it may be necessary to damp electro-mechanical transducers, in order that they quickly stop oscillating after the signal which caused them to oscillate has been cut off.

The manner in which this result is achieved in accordance with the known art leaves much to be desired. For example, a piezo-electric quartz crystal may be damped by lining the faces thereof with a material having a high mechanical impedance, such as araldite. However, a mechanical damping is generally not satisfactory.

It has also been suggested to use electric damping by transmitting to the vibrating member a blocking pulse of convenient amplitude, sign, and phase with respect to the exciter pulse, so as to block the mechanical oscillation caused by the latter.

This process is hardly applicable in an efficient way, since the blocking pulse parameters should be adjusted in accordance with the contact impedance between the oscillating member and the medium to which the mechanical vibrations are transmitted; now, this impedance may be quite variable and it would not be practicable to adjust the blocking pulses as this impedance varies.

The invention provides a novel system for electrically damping an electro-mechanical transducer.

The invention will be best understood from the following description with reference to the appended drawing, the only FIGURE of which shows by way of example a system according to the invention.

In the drawing, 1 is a source of electrical energy, 2 an electro-mechanical transducer device suitable for transforming electric energy into mechanical energy, 3 is a transformer whose secondary winding is coupled to the output of an amplifier 4, 5 a control device for controlling amplifier 4; 6 and 7 are adjustable condenser and resistance respectively.

As shown in the figure, the input of amplifier 4 is coupled to the midpoint E of the primary winding CD of transformer 3.

By way of example, it will be assumed that transducer 2 is a quartz crystal. It is connected across terminals A and B and, as it is known, when oscillating at its natural frequency, is electrically equivalent to a resistance 8 in parallel with a condenser 9 and in series with an electric source 10 having a nil internal resistance and generating a constant current. The circuit 11 according to the invention is connected across terminals A and B. The impedance across terminals A and B as seen from source 10, is the impedance $$-\frac{j}{C\omega}$$

of condenser 9. This impedance will be hereinbelow calculated in the actual case which has been illustrated in the drawing.

$I_1$ and $I_2$ being the currents, taken positive in the direction of the arrow, in resistance 8 and in the primary coil CD of transformer 3 respectively, it can be written:

$$V_C=V_A=(I_1+I_2)\cdot\left(-\frac{j}{C\omega}\right)$$

$$V_D=I_2.Z$$

where $V_A$, $V_C$, $V_D$ are the potentials at points A, C and D respectively, C the capacitance of condenser 9, and Z the impedance consisting of condenser 9 and resistance 8 (or condenser 6 and resistance 7 identical to the latter respectively). However in practice resistance 7 may be disregarded with respect to capacitance $$\frac{1}{C\omega}$$

and, accordingly $$\frac{j}{C\omega}$$

may be considered as substantially equal to Z.

Accordingly one can write:

$$V_C=(I_1+I_2)Z$$

Thus potential $V_E$ at the mid point E of winding CD will be:

$$V_E=\frac{V_C+V_D}{2}=\frac{I_1 Z}{2}$$

It should be noted that current $I_2$ is the current induced in winding CD by the winding of transformer 3, coupled to the output of amplifier 4, provided the current fed to winding CD by source 10 may be disregarded. This approximation is quite justifiable if the impedance of amplifier 4, as seen from source 10 across terminals CD, is high. This will be the case for example if the amplification chain 4 includes voltage amplifier stages having an amplification coefficient A and followed by a power amplifier stage with a pentode valve 13 having a transconductance $p$ and equivalent to a source of constant current equal to $p.A.V_E$.

Under these conditions, the constant current source 4 has a very high output impedance and accordingly establishes a very high impedance across terminals CD. Therefore, the current flowing through coil CD from source 10 is practically nill, and one can write:

$$I_2=p.A.V_E=p.A.I_1.\frac{Z}{2}$$

or:

$$|V_A|=\frac{j}{C\omega}(I_1+I_2)=\frac{j}{C\omega}\left(I_1=p.A.I_1\frac{Z}{2}\right)=\frac{j}{C\omega}I_1\left(1+pA\frac{Z}{2}\right)$$

Thus, due to the provision of circuit 11, the impedance seen from source 10 across terminals A and B is multiplied by factor $$\left(1+p.A.\frac{Z}{2}\right)$$

This factor can be made very great, which results in practically preventing the quartz from vibrating.

Experience has shown that the mechanical vibration of a quartz, or of another electro-mechanical transducer, is blocked as soon as the damping circuit of the invention becomes effective, that is as soon as the control device 5 renders conductive amplifier 4. The invention derives its value from this experimental confirmation and the applicant does not rely on the theoretical explanation which has been given above. In particular, it is not necessary for the operation of the device that amplifier 4 should include a constant current output stage.

It should be noted that the arrangement of the figure may be viewed as comprising a bridge circuit with two arms in parallel, namely ECAB to ground and ED to ground a feedback loop. The two arms of the bridge are balanced, one including the transducer and the other the electrical equivalent thereof and the feedback loop comprises amplifier 4. Thus the output voltage of the loop which is reinjected to the bridge (and makes the impedance across terminals CD as seen from transducer 2 very high to prevent the transducer from oscillating), is not in turn partially re-injected into the feed-back loop.

In other words, according to the invention, a feedback loop inserts a very high impedance across the electromechanical transducer terminals, the loop being connected across these terminals through a balanced bridge circuit which prevents the loop from going into oscillation.

For example, in the case illustrated in the drawing, it has been shown that $$V_E=\frac{I_1Z}{2}$$

Therefore, the voltage applied to amplifier 4 input does not depend upon $I_2$ and any self-oscillation is avoided.

It has been priorly taught to use an inductance coil forming with condenser 9 a tank circuit tuned at the working frequency of the crystal. This simple solution has an obvious drawback: the time constant of such a tank circuit is high and, therefore, its damping effect will become effective only after a given number of oscillations of the transducer. Besides the tank circuit will go on oscillating for some time after damping of the transducer. Thus this system would be practically difficult to use.

As a practical application of the device shown in the figure of similar devices, one may mention the damping of ultrasonic pulses transmitted by a piezo-electric transducer to a body to be examined. It is known that this damping is quite a problem and that each pulse transmitted is generally followed by spurious pulses of decreasing amplitude which render difficult the examination of the echoes on the receiver cathode ray tube screen.

According to one aspect of the invention, the electric pulse generator 1 which energizes quartz crystal 2 is also used to make conductive the normally blocked amplifier 4. This may be done through delay line 5 which is, for example, connected to the control grid 12 of the above mentioned pentode 13. By adjusting the delay caused by this line, amplifier 4 may be made conductive after a time equal, for example, to the half oscillation period of the crystal. The quartz crystal then produces ultrasonic pulses free of any spurious oscillation.

As further application examples, an arrangement according to the invention may be applied to the damping of a loud-speaker or microphone membrane, of a piezoelectric ceramic, etc. These examples are of course not limitative.

What is claimed is:

1. A system for damping the vibration of an electromechanical transducer, said system comprising: a first circuit comprising a first arm into which said transducer is coupled and a second arm having the same impedance as said transducer; a further circuit coupled to said first circuit and comprising a constant current source; and means for selectively switching said source in and out.

2. A system for damping the vibration of an electromechanical transducer, said system comprising: a first circuit comprising a first arm into which said transducer is coupled and a second arm having the same impedance as said transducer; a further circuit coupled to said first circuit; said further circuit comprising an amplifier; means for feeding energy to said amplifier; and control means for selectively blocking said amplifier and making the same conductive.

3. A system for damping the vibration of an electromechanical transducer, said system comprising: a first circuit comprising a first arm into which said transducer is coupled and a second arm having the same impedance as said transducer; a transformer having a primary circuit having a midpoint and a secondary circuit, said primary circuit being coupled in series between said two arms; an amplifier having an input and an output coupled to said secondary circuit; a feedback between said midpoint and said input; and means for selectively blocking and making conductive said amplifier.

4. A system for damping the vibration of an electromechanical transducer, said system comprising: a first circuit comprising a first arm into which said transducer is coupled and a second arm having the same impedance as said transducer; a transformer having a primary circuit having a midpoint and a secondary circuit, said primary circuit being coupled in series between said two arms; an amplifier having an input and including an output stage, having a tube having a control electrode and an output, the output impedance of said stage being high; the output of said stage being coupled to said secondary circuit; a feedback loop between said midpoint and said input; and means for biasing said electrode for selectively blocking said tube and making the same conductive.

5. A system for damping the vibrations of an electromechanical transducer controlled by a pulse generator, said system comprising: a first circuit comprising a first arm into which said transducer is coupled and a second arm having the same impedance as said transducer; a further circuit coupled to said first circuit and comprising a constant current source; and means for selectively switching said source in and out, said means being controlled by said pulse generator and including delay means for selectively delaying the controlling action of the pulses generated by said generator.

6. A system for damping the vibrations of an electromechanical transducer controlled by a pulse generator, said system comprising: a first circuit comprising a first arm into which said transducer is coupled and a second arm having the same impedance as said transducer; a transformer having a primary circuit having a midpoint and a secondary circuit, said primary circuit being coupled in series between said two arms; an amplifier having an input and an output coupled to said secondary circuit; a feedback loop between said midpoint and said input; and means for selectively blocking and making conductive said amplifier; said means being controlled by said pulse generator and including delay means for selectively delaying the controlling action of the pulses generated by said generator.

7. A system for damping the vibrations of an electromechanical transducer controlled by a pulse generator, said system comprising a first circuit comprising a first arm into which said transducer is coupled and a second arm having the same impedance as said transducer; a transformer having a primary circuit having a midpoint and a secondary circuit, said primary circuit being coupled in series between said two arms; an amplifier having an input, and including an output stage, having a tube having a central electrode, and an output, the output impedance of said stage being high; the output of said stage being coupled to said secondary circuit; a feedback between said midpoint and said input; and means for biasing said electrode for selectively blocking said tube and making the same conductive; said means being controlled by said pulse generator and including delay means for selectively delaying the controlling action of the pulses generated by said generator.

References Cited in the file of this patent

UNITED STATES PATENTS

| | | |
|---|---|---|
| 2,416,337 | Mason | Feb. 25, 1947 |
| 2,442,612 | Mynall | June 1, 1948 |
| 2,454,132 | Brown | Nov. 16, 1948 |
| 2,562,450 | De Lano | July 31, 1951 |
| 2,651,012 | Van Valkenburg et al. | Sept. 1, 1953 |
| 2,803,129 | Bradfield | Aug. 20, 1957 |